United States Patent
Rodgers et al.

(10) Patent No.: US 9,501,269 B2
(45) Date of Patent: Nov. 22, 2016

(54) AUTOMATIC SOURCE CODE GENERATION FOR ACCELERATED FUNCTION CALLS

(71) Applicant: Advanced Micro Devices, Inc., Sunnyvale, CA (US)

(72) Inventors: Gregory P. Rodgers, Austin, TX (US); Benjamin T. Sander, Austin, TX (US); Shreyas Ramalingam, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 14/501,296

(22) Filed: Sep. 30, 2014

(65) Prior Publication Data

US 2016/0092181 A1   Mar. 31, 2016

(51) Int. Cl.
*G06F 9/45* (2006.01)

(52) U.S. Cl.
CPC ..................... *G06F 8/447* (2013.01)

(58) Field of Classification Search
CPC .................. G06F 8/447; G06F 8/45
USPC .................. 717/140–145, 150–153
See application file for complete search history.

(56) References Cited

U.S. PATENT DOCUMENTS

| | | | | |
|---|---|---|---|---|
| 5,991,539 A * | 11/1999 | Williams | ................ | G06F 8/427 708/253 |
| 6,978,450 B2 * | 12/2005 | Burch | ...................... | G06F 8/48 715/229 |
| 7,035,781 B1 * | 4/2006 | Flake | ................. | G06F 17/5022 703/1 |
| 7,343,594 B1 * | 3/2008 | Metzgen | ............. | G06F 17/5054 717/140 |
| 7,472,375 B2 * | 12/2008 | Ye | ............................. | G06F 8/52 717/106 |
| 7,685,582 B2 * | 3/2010 | Haselden | ................ | G06F 8/315 717/150 |
| 7,784,038 B2 * | 8/2010 | Charlebois | ............. | G06F 8/443 717/140 |
| 7,818,729 B1 * | 10/2010 | Plum | .................. | G06F 11/3624 717/140 |
| 7,954,094 B2 * | 5/2011 | Cascaval | ............. | G06F 9/45516 717/140 |
| 8,087,011 B2 * | 12/2011 | Eichenberger | .......... | G06F 8/452 717/150 |
| 8,099,725 B2 * | 1/2012 | Jin | ..................... | G06F 17/30404 717/106 |
| 8,181,166 B2 * | 5/2012 | Shinn | ....................... | G06F 8/71 717/140 |
| 8,296,743 B2 * | 10/2012 | Linderman | ............. | G06F 9/505 717/140 |
| 8,365,156 B2 * | 1/2013 | Sollich | ...................... | G06F 8/44 717/143 |
| 8,595,711 B2 * | 11/2013 | Clifton | .................... | G06F 8/443 717/145 |
| 8,621,446 B2 * | 12/2013 | Archer | ...................... | G06F 8/45 717/120 |
| 8,789,204 B2 * | 7/2014 | Helander | ................ | G06F 21/51 715/240 |
| 8,869,127 B2 * | 10/2014 | Dolby | ....................... | G06F 8/72 717/150 |
| 8,924,946 B2 * | 12/2014 | Bikshandi | ............... | G06F 8/458 717/136 |
| 8,959,579 B2 * | 2/2015 | Barton | ............... | G06F 21/6218 726/1 |

OTHER PUBLICATIONS

Mischke et al, "Tool support for semi-automatic modularization of existing code bases", ACM, pp. 1-4, 2009.*

(Continued)

*Primary Examiner* — Anil Khatri

(57) ABSTRACT

A programming model for a processor accelerator allows accelerated functions to be called from a main program directly without a management API for the accelerator. A compiler automatically generates wrapper source code for each accelerator function called by the application source code. The wrapper code is compiled, together with the accelerator source code, to generate an object file that is linked to an object file for the main program. By automatically generating the wrapper code, a programmer can simply and directly invoke accelerator functions without the use of a complex management API. In addition, because the wrapper code for the accelerator is generated automatically, a standard compiler can be used to compile the main program, using standard linkage conventions.

20 Claims, 7 Drawing Sheets

(56) References Cited

OTHER PUBLICATIONS

Li et al, "A Wrapper Generator for Wrapping High Performance Legacy Codes as Java/CORBA Components", IEEE, pp. 1-12, 2000.*
Irmak et al, "Interactive Wrapper Generation with Minimal User Effort", ACM, pp. 553-563, 2006.*
Yoo et al, "A Generic Wrapper Architecture for Multi-Processor SoC Cosimulation and Design", ACM, pp. 195-200, 2001.*
Zheng et al, "Joint Optimization of Wrapper Generation and Template Detection", ACM, pp. 894-902, 2007.*
Raposo et al, "Automatic Wrapper Maintenance for Semi-Structured Web Sources Using Results from Previous Queries", ACM, pp. 654-659, 2005.*
Hao et al, "A Two-Phase Rule Generation and Optimization Approach for Wrapper Generation", ACM, pp. 1-10, 2006.*
McCool et al., "Shader Metaprogramming" (Revised), Proceedings of the ACM SIGGRAPH/Eurographics conference on Graphics hardware. Eurographics Association, Sep. 1, 2002, 12 pages.
Lejdfors et al., "Implementing an Embedded GPU Language by Combining Translation and Generation", SAC'06—ACM Symposium on Applied Computing, Apr. 23, 2006, 5 pages.

* cited by examiner

AUTOMATIC SOURCE CODE GENERATION FOR ACCELERATED FUNCTION CALLS

BACKGROUND

1. Field of the Disclosure

The present disclosure relates generally to processors and more particularly to processors having accelerated processing units.

2. Description of the Related Art

To enhance processing efficiency, a modern processor can employ one or more accelerators, whereby the accelerators perform designated functions on behalf of one or more central processing units (CPUs). For example, a processor can include a graphics processing unit (GPU) to perform graphics and image processing functions for the processor. In order to execute a function at the accelerator, the function must be invoked, or called, by an application program executing at the processor CPUs. Accordingly, the programmer of the application program must include the function calls in the application program. Typically, the programmer must employ an application program interface (API) to use the accelerator in order to ensure that the functions are properly called by the application program. However, such an API is usually complex, increasing the time required to prepare and debug the application program.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-8 illustrate techniques for providing a programming model for a processor accelerator wherein accelerated functions are called directly from a main program without a management API for the accelerator. A compiler automatically generates wrapper source code for each accelerator function called by the application source code. The wrapper code is compiled, together with the accelerator source code, to generate an object file that is linked to an object file for the main program. By automatically generating the wrapper code, the application can simply and directly invoke accelerator functions without the use of a complex management API. In addition, because the wrapper code for the accelerator is generated automatically, a standard compiler can be used to compile the main program, using standard linkage conventions. This allows for the accelerator to be used in a variety of device and programming environments without extensive redesign of either the accelerator code or the main program code.

To illustrate via an example, a processor can include a GPU as an accelerator for graphics and image processing functions. Conventionally, a programmer invokes a function of the GPU, within the main program, via an API such as the Compute Unified Device Architecture (CUDA) or Open Graphics Library (OpenGL). However, these APIs typically require the programmer to include, for each function call, supporting source code that ensures the corresponding function call is properly invoked and executed. This requires the programmer to have extensive knowledge of a potentially complex API, increasing programming and debug time. Further, the main program is tied to the particular API being used, limiting program portability and flexibility. In contrast, under the techniques described herein, a compiler automatically generates the supporting code for each function call to the GPU from a set of function call templates, thereby reducing programming and debug time, and improving program portability and flexibility.

As used herein, a processor accelerator (sometimes referred to simply as an "accelerator") refers to a programmable portion of a processor that performs accelerated functions for a program being executed at a general purpose processing unit of the processor, such as a CPU. Examples of accelerators can include GPUs, digital signal processors (DSPs), cryptographic accelerators (e.g., Secure Sockets Layer (SSL) accelerators), Transmission Control Protocol (TCP) offload engines, regular expression hardware accelerators, and the like. For purposes of description, FIGS. 1-7 are described in the example context wherein the accelerator is a GPU, but those skilled in the art will appreciate that the techniques described herein can be employed for other types of accelerators. In addition, as used herein, a wrapper denotes the necessary and often complex code needed to launch an accelerator function.

Figure 1:
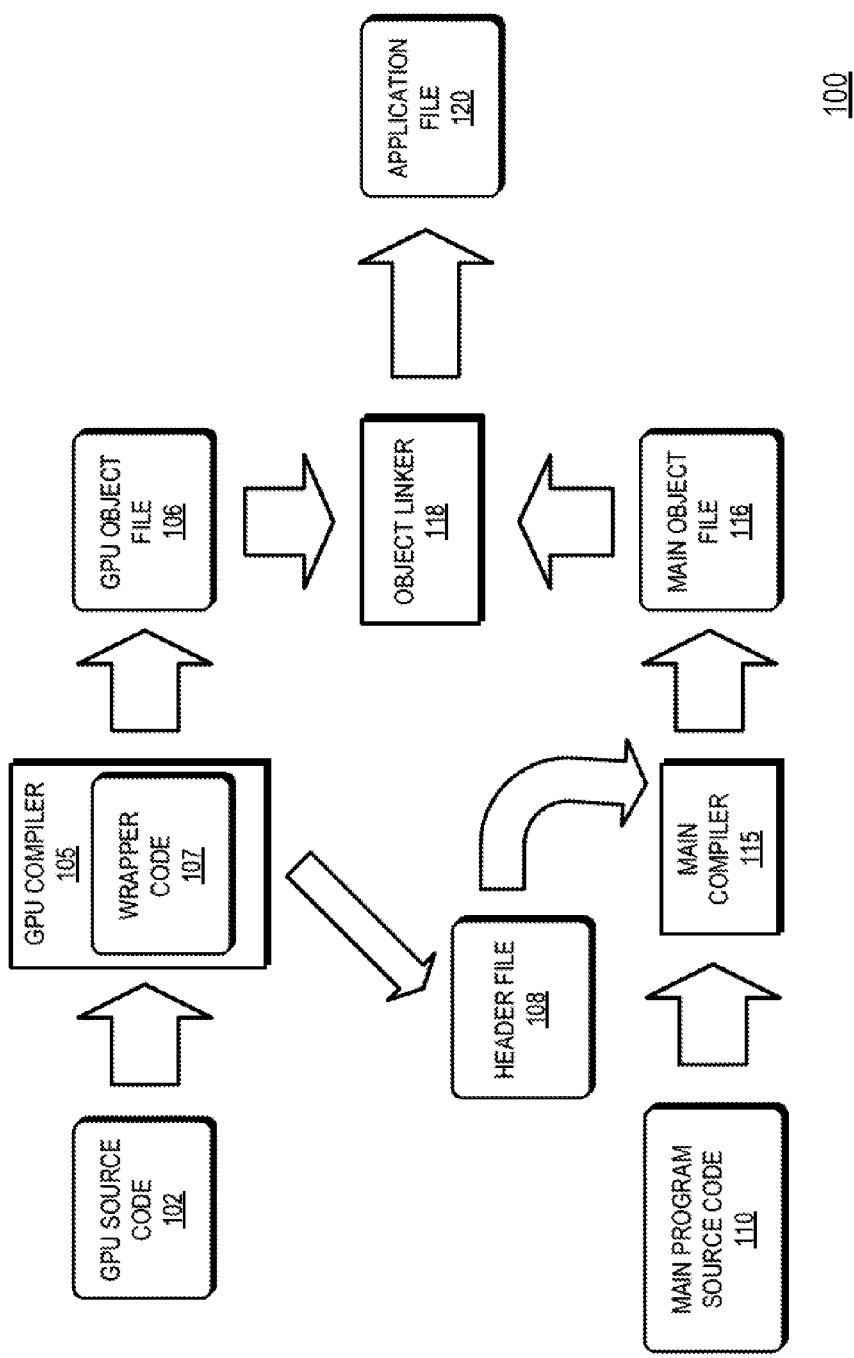
FIG. 1 is a block diagram illustrating a compiler system that automatically generates source code to invoke a function at a GPU in accordance with some embodiments.

FIG. 1 illustrates a compiler system 100 to compile a main program (e.g., an application program) in accordance with some embodiments. In the depicted example, the compiler system 100 compiles a main program represented by GPU source code 102 and main program source code 110 to generate an application file 120. The main program source code 110 is one or more computer files including source code prepared by programmers to control the operations of a general purpose portion of a processor, such as one or more CPUs. The GPU source code 102 is one or more computer files prepared by programmers to represent the logic to execute on the accelerator. As described further herein, the compiler system 100 compiles the GPU source code 102 and the main program source file 110 to generate the application file 120 as a machine executable file. Accordingly, the application file 120 stores instructions that, when executed at the processor, perform the operations designated by the main program source code 110 and by the GPU source code 102.

To facilitate generation of the application file 120, the compiler system 100 includes a GPU compiler 105, a main compiler 115, and an object linker 118. The GPU compiler 105 is a compiler executed at a server or other computer device that converts the GPU source code 102 to a GPU object file 106. In some embodiments, the GPU compiler 105 includes one or more computer programs that, when executed during the development phase of the application, performs lexical analysis, preprocessing, parsing, semantic analysis, code generation, and code optimization to generate the GPU object file 106.

During compilation, the GPU compiler 105 generates wrapper code 107 for the kernels of the function calls for the GPU source code 102. The wrapper code 107 is supporting source code for each kernel that ensures that the kernels are properly called and executed at the GPU. Accordingly, the wrapper code can include memory allocation instructions, data transfer instructions, variable and data structure declarations, and other code required by each kernel to be called and executed at the GPU. The GPU compiler 105 generates the wrapper code 107 by identifying and copying one or more source code templates for each identified kernel, as described further below with respect to FIGS. 2-5. In addition to the wrapper code 107, the GPU compiler 105 generates a header file 108 including variable and structure declarations, value assignments, and other code that will be used during compilation of the main program source code 110 to ensure that GPU object file 106 can be properly linked and executed as part of the application file 120.

After generating the wrapper code 107 and the header file 108, the GPU compiler 105 compiles the GPU source code 102 to machine code and embeds the machine code in the wrapper code 107. In some embodiments, the GPU compiler 105 forms a data structure for storing machine code, and stores the compiled GPU source code 102 at the data structure. This eliminates the need to manage a separate file (a side file) having the compiled GPU source code 102. The GPU compiler 105 then compiles the wrapper code 107, including the embedded machine code based on the GPU source code 102, to generate the GPU object file 106.

The main compiler 115 is a compiler generally configured to perform lexical analysis, preprocessing, parsing, semantic analysis, code generation, and code optimization, and other compilation functions to compile the main program source code 110, together with the header file 108, to generate the main object file 116. In some embodiments, because the compiler system 100 does not employ a special API that allows the main program to interface with a particular type of GPU, the main compiler 115 can be any compiler that uses standard linkage conventions. This simplifies and provides flexibility in the compilation of the main program source code 110 relative to conventional systems, and provides for reuse of the main program source code 110 for different processors having different types of GPUs. That is, the main compiler 115 does not have to trained or modified for the particular GPU or accelerator.

The object linker 118 is generally configured to link the GPU object file 106 and the main object file 116 to form the application file 120. In some embodiments, the object linker 118 is a conventional linker that generates the application file 120 by performing symbol identification, symbol resolution, location of objects in an address space, and other linker functions as understood by one skilled in the art. The linking process is standardized to provide flexibility in the final compilation of the application file 120.

As described above, the compilation system 100 automatically generates wrapper code 107 that allows accelerated GPU functions to be called directly from the main program, rather than through an API associated with the GPU. This allows the main program source code 110 to be compiled using a standard compiler that uses standard linkage conventions. Further, in some embodiments, the wrapper code 107 has been tested and debugged to ensure proper execution of kernels at the GPU. This allows the programmer to focus on proper design of the logic underlying the main program, rather than on extensive programming and debugging of the API. The compilation system 100 thereby facilitates simpler and more efficient programming of applications that employ GPU functions.

Figure 2:
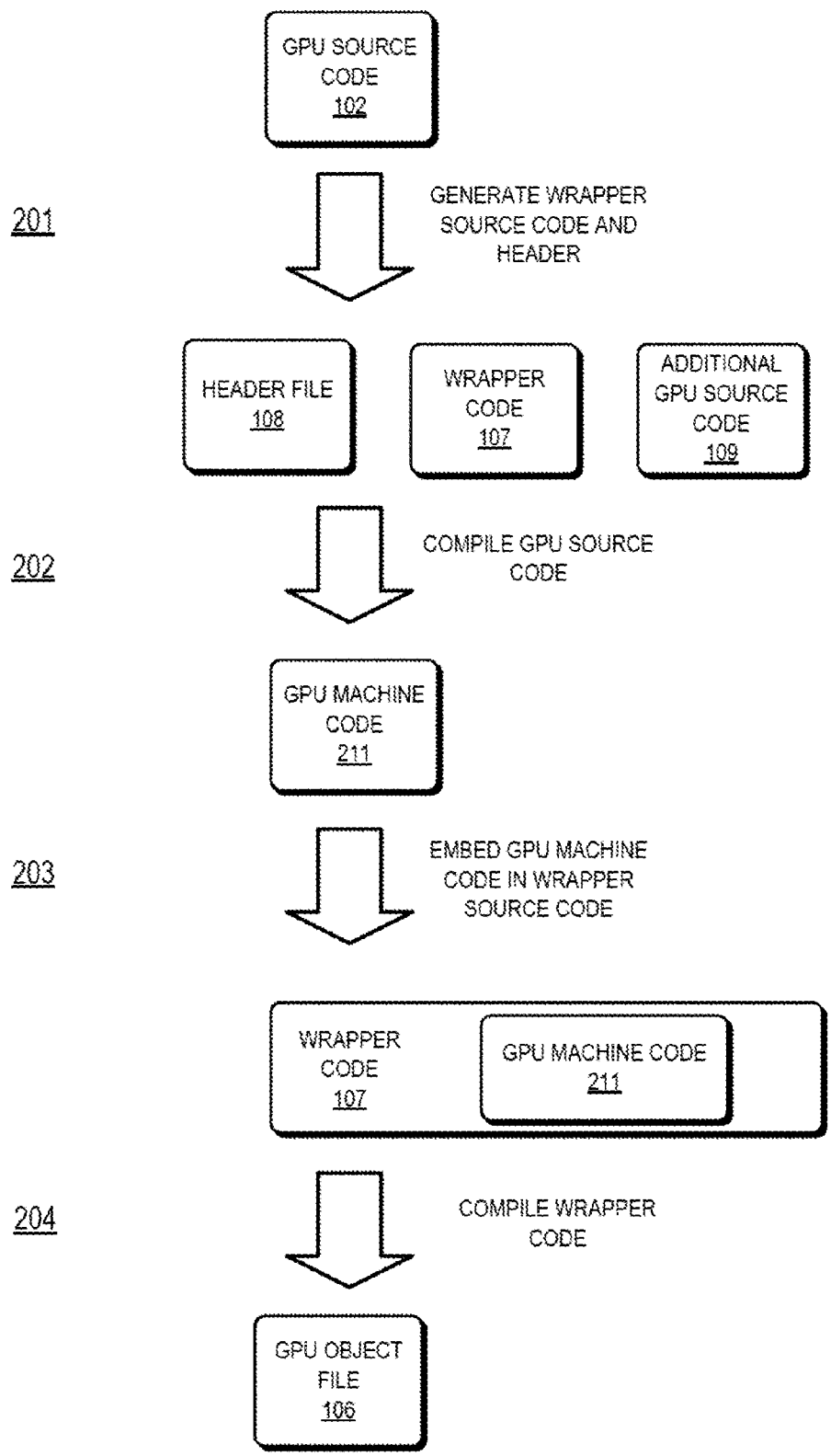
FIG. 2 is a block diagram illustrating operation of the GPU compiler system of FIG. 1 in accordance with some embodiments.

FIG. 2 illustrates an example operation of the GPU compiler system system 105 of FIG. 1 in accordance with some embodiments. At time 201, the GPU compiler 105 generates wrapper code 107 and header file 108 based on the functions set forth in the GPU source code 102. In some embodiments the GPU compiler will generate additional GPU Source code file 109. At time 202 the GPU compiler 105 compiles the GPU source code 102 together with additional GPU Source code file 109 to generate GPU machine code 211. At time 203 the GPU compiler 105 embeds the GPU machine code 211 in the wrapper code 107. The GPU compiler 105 creates a binary string data structure for the wrapper code 107 to contain the embedded GPU machine code 211. At time 204 the GPU compiler 105 compiles the wrapper code 107, including the embedded GPU machine code 211, to generate the GPU object file 106. The product of this process is the GPU Object file 106 and the header file 108. The former is used to link the final application and the latter is used to guide correct compilation of the main source where the main source calls the GPU function in the same syntax as calls to any other function.

Figure 3:
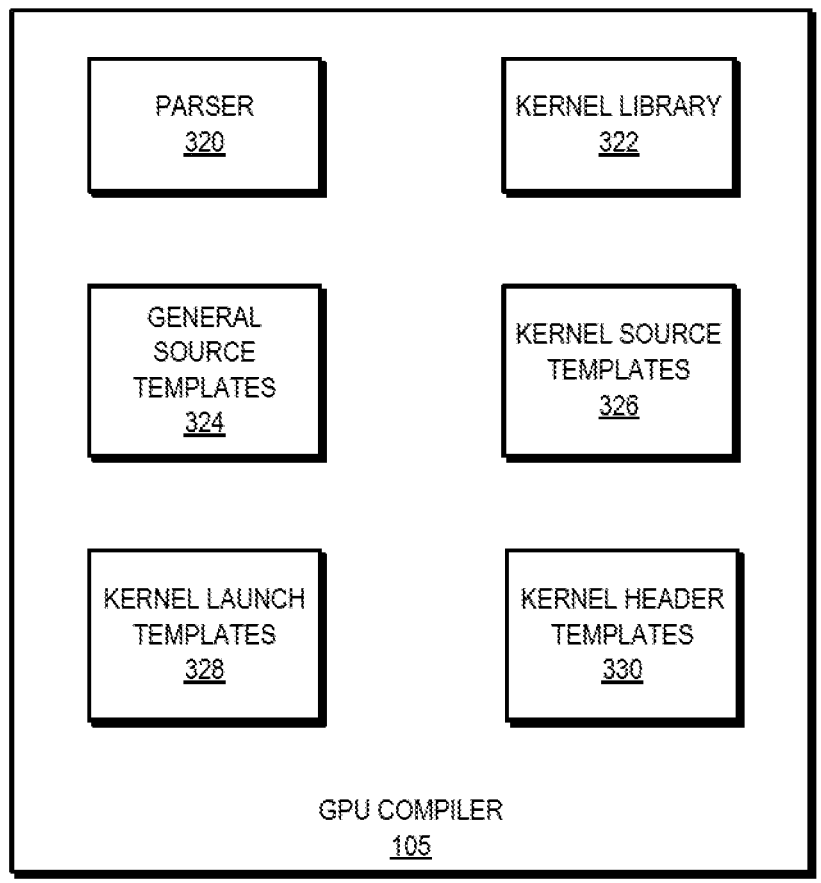
FIG. 3 is a block diagram of the GPU compiler of FIG. 1 in accordance with some embodiments.

FIG. 3 is a block diagram of the components of the GPU compiler 105 of FIG. 1 in accordance with some embodiments. In the depicted example, the compiler 105 includes a parser 320, a kernel library 322, general source templates 324, kernel source templates 326, kernel launch templates 328, and kernel header templates 330. The parser 320 is generally configured to analyze strings of symbols in GPU source code to identify function calls for a GPU. In some embodiments the parser 320 can build a data structure (e.g., a parse tree or other hierarchical structure) that indicates the functions calls.

The kernel library 322 stores GPU kernels corresponding to functions identified in GPU source code. After the parser has generated the functional call data structure, the GPU compiler 105 identifies the kernel corresponding to each function call. The general source templates 324, kernel source templates 326, kernel launch templates 328, and kernel header templates 330 store source code to generate the wrapper code for each kernel identified by the GPU compiler 105. That is each of the templates 326, 328, and 330 store pre-prepared text, symbols, or other form of source code that, when compiled allow a corresponding kernel to be executed properly at a GPU associated with the templates.

To illustrate via an example, a given kernel may be MUL(A,B) kernel that executes a multiply on two arrays, A and B. In order to properly execute the multiply operation, the GPU may require that the variables A and B be placed in a particular format, that the values stored by A and B be placed in a particular order, and that the length of A and B be defined. The templates 326, 328, and 330 corresponding to the MUL(A,B) kernel store source code that, when compiled and executed, perform these operations to ensure that MUL(A,B) returns expected results. Accordingly, by copying the appropriate templates to the wrapper code 107 and compiling that code to be part of the application file 120, the GPU compiler 105 ensures that the application file 120 performs as expected by the programmer. Further, the GPU compiler 105 automatically identifies and copies the appropriate templates for each kernel of the GPU source code 102. This relieves the programmer from having to learn and debug the code included in the templates, reducing overall program time and effort.

In operation, in response to receiving GPU source code, the GPU compiler 105 generates wrapper code as follows. First, the GPU compiler 105 includes the general source templates 324, a general set of source code required to execute the identified kernels. For example, the general source code can have a list of reusable subroutines and defined data structures needed during execution, and code to check if an accelerator device is available. This general source code keeps track of previous calls to the function to prevent unnecessary repetition of the accelerator initialization process. Next, for each identified kernel the GPU compiler identifies a code template at the kernel source templates 326. Each kernel initialization template includes, for the corresponding kernel, the code required to ensure that the kernel is properly invoked and executed. For example, this template has kernel specific subroutines and data structures that will be needed for each kernel. If the kernel is being called for the first time, this code initializes kernel specific data structures. This code also tracks if a previous call initialized these data structures to avoid reinitializing the data structures. In some embodiments, the selected template is based on interpreting system launch attributes provided by the application source code via one or more arguments. The GPU compiler 105 copies and customizes the identified kernel source templates to the wrapper code 107. The GPU compiler 105 then generates the declaration for the user function of the corresponding kernel and copies the declaration, with the appropriate set of arguments, to the wrapper code 107. The GPU compiler 105 next customizes the kernel launch templates 328 to add any source code required to process each kernel argument to prepare for the launch of the kernel, and copies the identified source code to the wrapper code 107. The GPU compiler 105 can also copy, from the kernel launch templates 328 to the wrapper code 107, any source code need to launch the kernel itself. Finally, the GPU compiler 105 identifies a header for the kernel from the kernel header templates 330, and copies the identified header to the header file 108. These header files are used in the compilation of the main source code to ensure that the application uses the correct set of arguments to call the generated wrapper. The format for header files can vary for different types of main source code. For example, the header could be different for FORTRAN than for C or C++.

In some embodiments, after copying the source code for each identified kernel from the templates 324, 226, and 328 to the wrapper code 107, the compiler 105 identifies any call-by-value arguments for the kernels. The GPU compiler 105 then generates additional GPU source code to convert any call-by-reference arguments to call-by-value arguments, and copies the generated source code to an updated GPU source file.

Figure 4:
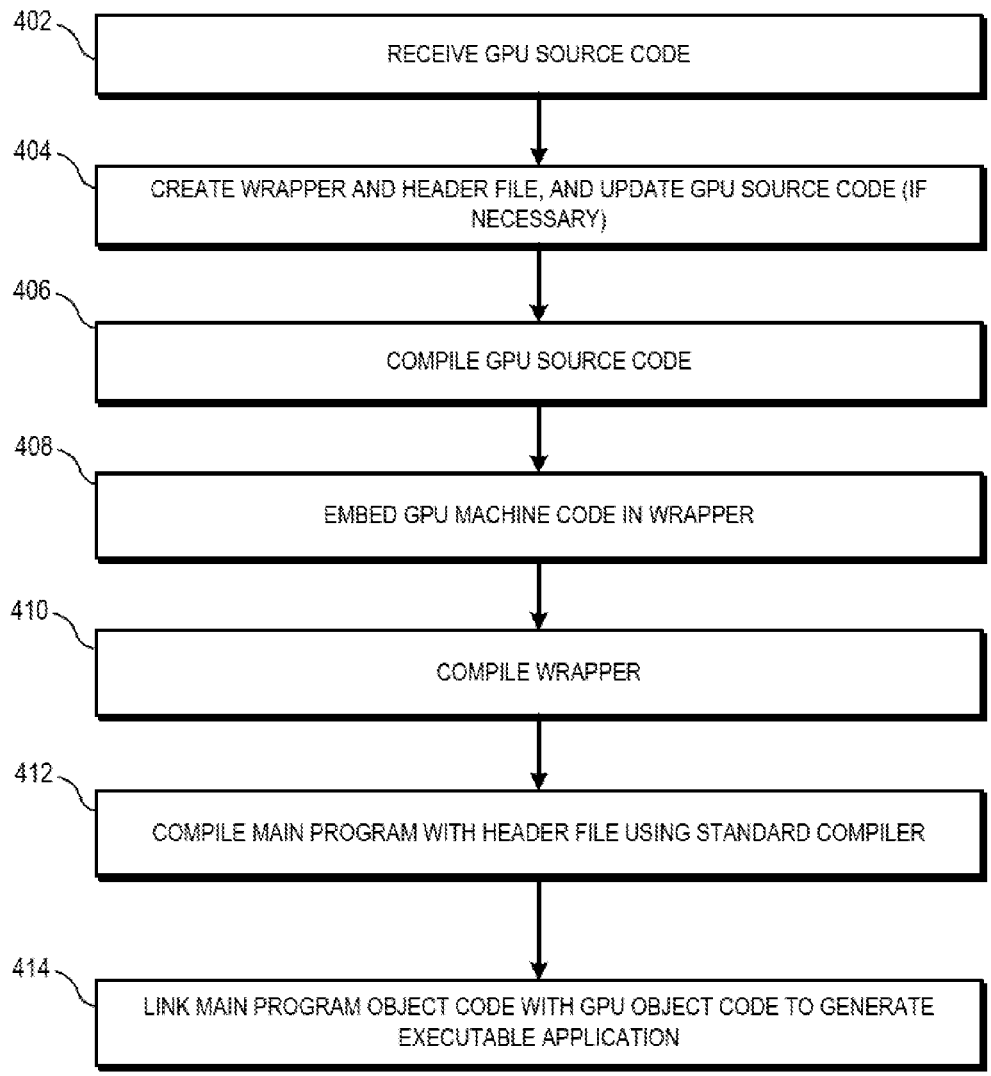
FIG. 4 is a flow diagram of a method of automatically generating source code for a GPU function call during compilation in accordance with some embodiments.

FIG. 4 illustrates a flow diagram of a method 400 of automatically generating source code for accelerated function calls at the compiler system 100 of FIG. 1 in accordance with some embodiments. At block 402 the GPU compiler 105 receives the GPU source code 102. At block 404, the GPU compiler 105 creates the wrapper code 107 and the header file 108, as described herein, to ensure that the GPU kernels reflected in the GPU source code 102 are properly executed. In addition, the GPU compiler 105 determines whether any modifications to the GPU source code 102 must be made in order to ensure that the kernels are executed correctly and, if so, rewrites the GPU source code 102 to include those changes. These changes map the limitations and capabilities of the kernel source language to that of the generated host code wrapper function. For example, if any arguments to the user function are call-by-value structures (non-scalar), the GPU kernel code must be modified to add a proxy function that converts via a copy of the call by reference (address) to the call-by-value structure because the interface between the generated host code and the GPU kernel can only pass an address (call-by reference) or a scalar.

At block 406, the GPU compiler 105 compiles the GPU source code 102 to generate corresponding GPU machine code. At block 408 the GPU compiler 105 embeds the GPU machine code in the wrapper code 107. At block 410 the GPU compiler 105 compiles the wrapper code 107, with the embedded GPU machine code, to generate the GPU object file 106. At block 412, the GPU compiler 105 compiles the main program source code 110 with the header file 108 to generate the main object file 116. At block 414, the object linker links the main object file 116 and the GPU object file 106 to generate the application file 120.

Figure 5:
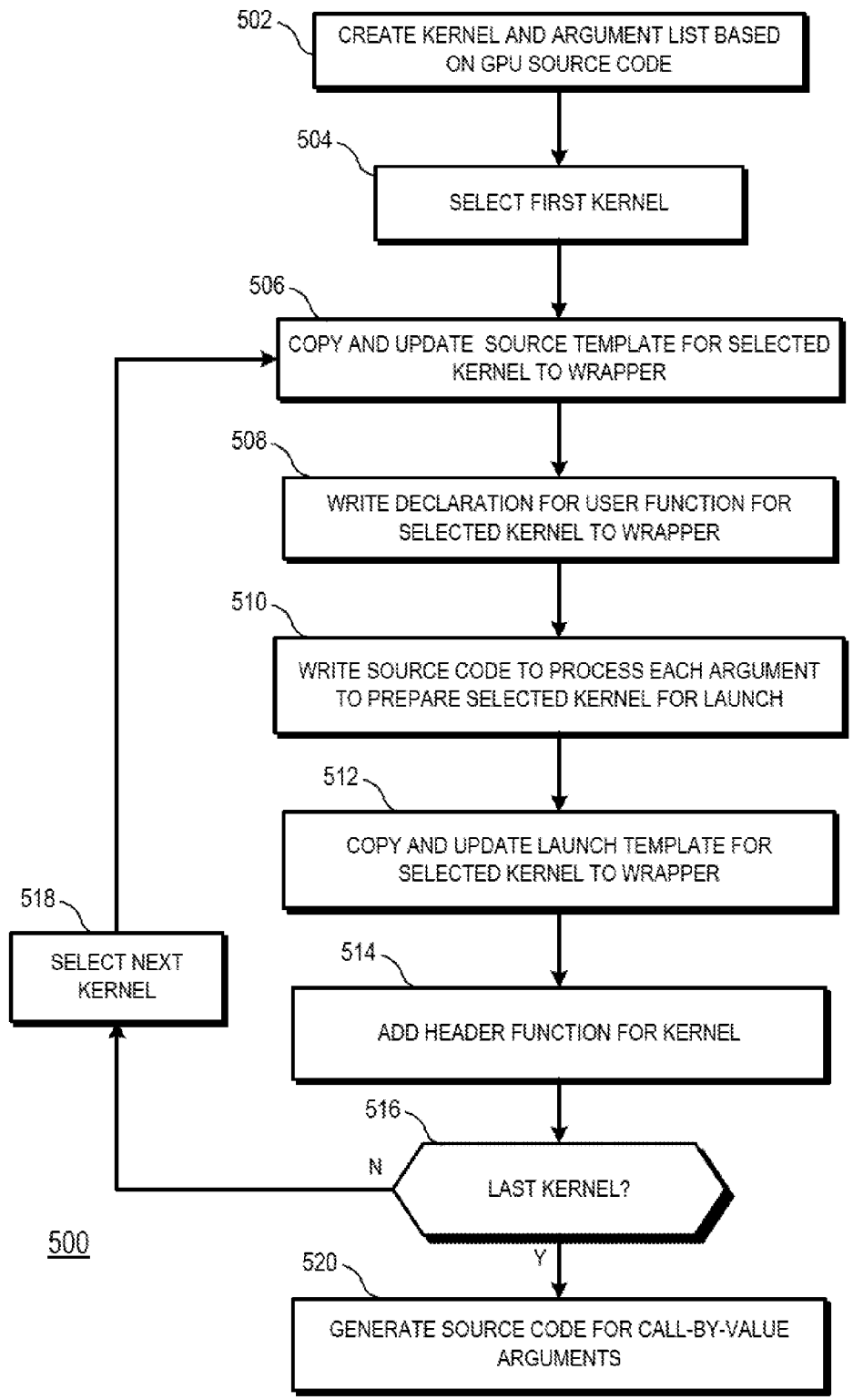
FIG. 5 is a flow diagram of a method of generating wrapper code for GPU functional calls in accordance with some embodiments.

FIG. 5 illustrates a flow diagram of a method 500 of generating the wrapper code 107 and header file 108 of FIG. 1 in accordance with some embodiments. At block 502, the parser 320 (FIG. 3) analyzes the GPU source code 102 and identifies, for each function call to the GPU, the corresponding kernel and arguments, and creates a list of the identifies kernels and arguments. At block 504, the GPU compiler 105 selects the first kernel in the list. At block 506, the GPU compiler 105 selects, from the kernel source templates 326, the kernel source template corresponding to the selected kernel and copies the selected kernel source template to the wrapper code 107.

At block 508, the GPU compiler 105 writes a declaration for the user function corresponding to the selected kernel to the wrapper code 107. At block 510 the GPU compiler 105 writes to the wrapper code 107 any source needed to process each argument of the kernel to prepare the kernel for launch. For example, in some embodiments, the arguments of the kernel must be reformatted or reorganized so that they are in a form expected by the kernel. The GPU compiler 105 can identify the format of each argument, compare the format to a format expected by the kernel, and automatically copy, from one of the templates 326, 328, and 330, source code to reformat the arguments to the expected format. The GPU compiler 105 writes the code copied from the template to the wrapper code 107.

At block 510, the GPU compiler 105 copies from the kernel launch templates 328 to the wrapper code 107 the kernel launch code for the selected kernel. At block 514 the GPU compiler 105 copies from the kernel header templates 330 to the header file 108 the header function for the selected kernel. At block 516 the GPU compiler 105 identifies whether the selected kernel is the last kernel in the list. If not, the method flow moves to block 518 and the GPU compiler 105 selects the next kernel. The method flow proceeds to block 506 to add the wrapper code and header function for the selected kernel to the wrapper code 107 and the header file 108, respectively. Returning to block 516, if the GPU compiler 105 determines that the selected kernel is the last kernel in the list, the method flow moves to block 520, and the GPU compiler 105 generates source code to convert call-by-reference arguments to call-by-value arguments and writes the generated source code to the wrapper code 107. The wrapper code 107 is then ready for embedding of the GPU machine code and for compilation.

Figure 6:
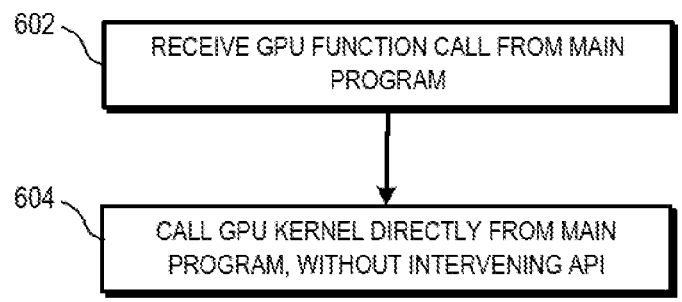
FIG. 6 is a flow diagram of a method of calling an accelerator function directly, without the use of an intervening management API in accordance with some embodiments.

FIG. 6 is a flow diagram of a method 600 of calling a GPU function from a main program in accordance with some embodiments. At block 602, a processor receives a function call for a GPU function in a main program, such as an application program. At block 604, the processor calls the function at the GPU directly. As used herein, calling a function directly at an accelerator refers to invoking that function at the accelerator without the user of an intervening application program interface (API).

Figure 7:
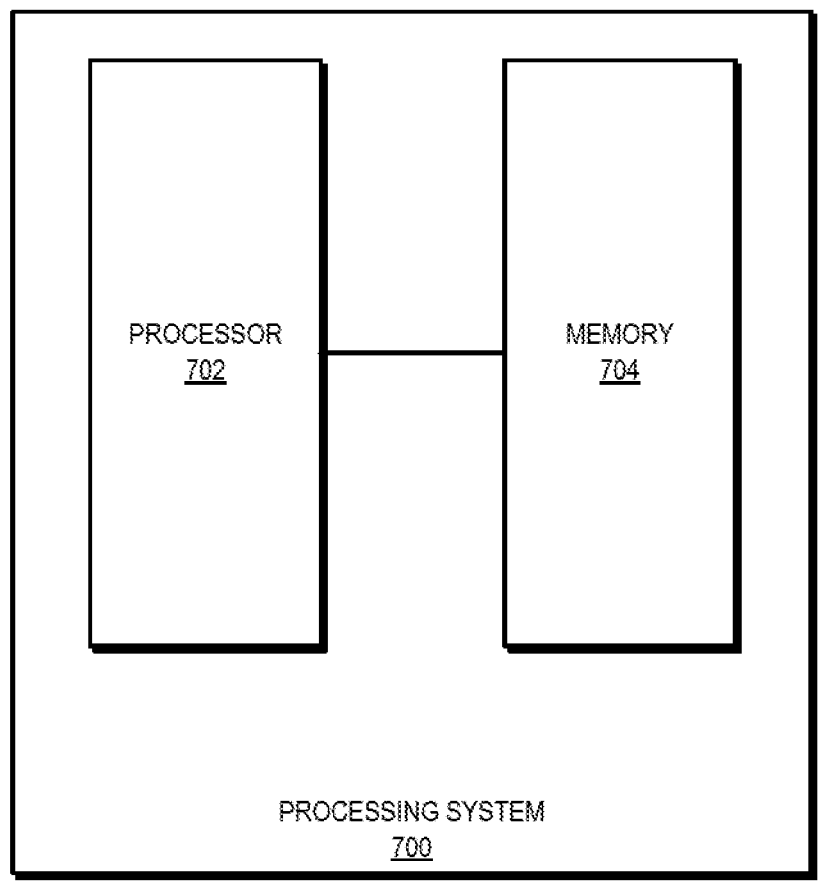
FIG. 7 is a block diagram of a processing system to perform compilation and other operations in accordance with some embodiments.

FIG. 7 illustrates a block diagram of a processing system 700 for compiling and executing programs in accordance with some embodiments. The processing system 700 includes a processor 702 and a memory 704. The processor 702 can be a general purpose processor that includes one or more processor cores to execute program instructions. The processor cores can form one or more central processing units (CPUs). In addition, in some embodiments the processor 702 can include one or more accelerators, such as one or more GPUs. The memory 704 can be any form of computer data storage device, or combination thereof, including random access memory (RAM), flash memory, solid state drive (SSD) memory, hard disk drive, and the like.

In operation, the processing system 700 can execute one or more computer programs to perform one or more of the methods and operations described herein. For example, in some embodiments the memory 704 can store instructions and data that compose the GPU compiler 105, including the templates 324, 326, 328, and 330. These instructions can, when executed at the processor 702, manipulate the processor to perform one or more of the methods and operations described herein, including the methods of FIGS. 4 and 5.

In some embodiments, the apparatus and techniques described above are implemented in a system comprising one or more integrated circuit (IC) devices (also referred to as integrated circuit packages or microchips). Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 8:
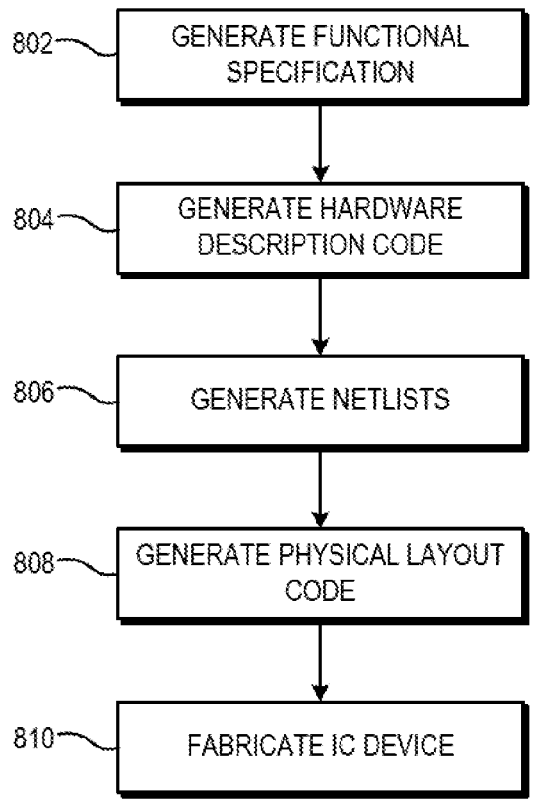
FIG. 8 is a flow diagram illustrating a method for designing and fabricating an integrated circuit device implementing at least a portion of a component of a processing system in accordance with some embodiments.

FIG. 8 is a flow diagram illustrating an example method 800 for the design and fabrication of an IC device implementing one or more aspects in accordance with some embodiments. As noted above, the code generated for each of the following processes is stored or otherwise embodied in non-transitory computer readable storage media for access and use by the corresponding design tool or fabrication tool.

At block 802 a functional specification for the IC device is generated. The functional specification (often referred to as a micro architecture specification (MAS)) may be represented by any of a variety of programming languages or modeling languages, including C, C++, SystemC, SIMULINK® language, or MATLAB® language.

At block 804, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 806 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 808, one or more EDA tools use the netlists produced at block 806 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 810, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   receiving, at a computer device, source code indicating a processor accelerator function;
   automatically generating wrapper code at the computer device to call the processor accelerator function, the wrapper code including at least one of memory allocation instructions, data transfer instructions, variable and data structure declarations to be called and executed by an accelerator; and
   compiling the wrapper code and the source code to generate an application program.

2. The method of claim 1, wherein compiling the wrapper code and the source code further comprises:
   compiling the source code to generate machine code;
   embedding the machine code in the wrapper code; and
   compiling the wrapper code with the embedded machine code.

3. The method of claim 1, further comprising:
   generating a header file at the computer device for the wrapper code.

4. The method of claim 3, further comprising compiling a main program at the computer device with the header file.

5. The method of claim 4, wherein compiling the wrapper code and the source code comprises linking compiled wrapper code, compiled source code, and compiled main program code to generate the application program.

6. The method of claim 1, wherein automatically generating the wrapper code comprises:
   selecting a stored kernel template from a plurality of stored kernel templates based on the processor accelerator function, copying the kernel template to the wrapper code, and customizing the copied template with information derived from kernel source.

7. The method of claim 6, wherein automatically generating the wrapper code further comprises:
   automatically writing a user function for the processor accelerator to the wrapper code.

8. The method of claim 7, wherein automatically generating the wrapper code further comprises:
   automatically generating argument source code to process arguments of the processor accelerator function to change a format of the arguments and writing the argument source code to the wrapper code.

9. The method of claim 8, wherein automatically generating the wrapper code further comprises:
   selecting a stored kernel launch template from a plurality of stored kernel launch templates based on the processor accelerator function, copying the kernel launch template to the wrapper code and customizing the copied template with information derived from kernel source.

10. The method of claim 9, wherein automatically generating the wrapper code further comprises:
    interpreting system launch attributes provided by the source code via one or more arguments.

11. The method of claim 1, wherein the processor accelerator function is a graphics processing unit (GPU) function.

12. A method, comprising:
receiving a processor accelerator function call at a computer device, the processor accelerator function call including at least one of memory allocation instructions, data transfer instructions, variable and data structure declarations to be called and executed by an accelerator; and
calling the processor accelerator function at the computer device directly without an intervening application program interface (API).

13. A non-transitory computer readable medium embodying a set of executable instructions, the set of executable instructions to manipulate at least one processor to:
receive, at a computer device, source code indicating a processor accelerator function;
automatically generate wrapper code at the computer device to call the processor accelerator function, the wrapper code including at least one of memory allocation instructions, data transfer instructions, variable and data structure declarations to be called and executed by an accelerator; and
compile the wrapper code and the source code to generate an application program.

14. The computer readable medium of claim 13, wherein the set of executable instructions comprise instructions to:
compile the source code to generate machine code;
embed the machine code in the wrapper code; and
compile the wrapper code with the embedded machine code.

15. The computer readable medium of claim 13, wherein the set of executable instructions comprise instructions to:
generate a header file at the computer device for the wrapper code.

16. The computer readable medium of claim 15 wherein the set of executable instructions comprise instructions to compile a main program at the computer device with the header file.

17. The computer readable medium of claim 16, wherein the set of executable instructions comprise instructions to link compiled wrapper code, compiled source code, and compiled main program code to generate the application program.

18. The computer readable medium of claim 13, wherein the set of executable instructions comprise instructions to:
select a stored kernel template from a plurality of stored kernel templates based on the processor accelerator function, and copying the kernel template to the wrapper code.

19. The computer readable medium of claim 18, wherein the set of executable instructions comprise instructions to:
automatically write a user function for the processor accelerator to the wrapper code.

20. The computer readable medium of claim 19, wherein the set of executable instructions comprise instructions to:
automatically generate argument source code to process arguments of the processor accelerator function to change a format of the arguments and writing the argument source code to the wrapper code.

* * * * *